(12) United States Patent
Kolodziej et al.

(10) Patent No.: US 6,282,785 B1
(45) Date of Patent: Sep. 4, 2001

(54) TORQUE CONVERTER BLADES BRAZED TO A HOUSING USING A MAGNETIC HEATING PROCESS

(75) Inventors: Dennis Raymond Kolodziej, Redford Township; Jill Marie Wilson, Belleville, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/340,604

(22) Filed: Jun. 28, 1999

(51) Int. Cl.$^7$ ................................................. B23P 15/00
(52) U.S. Cl. ............................................. 29/889.5; 29/889
(58) Field of Search ................... 29/889.5, 428, 29/889; 219/10.57, 10.67, 10.43, 9.5; 416/197 C

(56) References Cited

U.S. PATENT DOCUMENTS

| | | |
|---|---|---|
| 3,211,364 | 10/1965 | Wentling et al. . |
| 4,496,818 | 1/1985 | Reynolds et al. . |
| 4,584,835 * | 4/1986 | Nishi .................................. 29/889.5 |
| 4,864,706 | 9/1989 | Jenkel . |
| 4,868,365 | 9/1989 | Farone et al. . |
| 5,000,366 * | 3/1991 | Beattie ................................ 29/889.5 |
| 5,023,419 | 6/1991 | Langstedt . |
| 5,025,124 | 6/1991 | Alfredeen . |
| 5,065,509 * | 11/1991 | Sahashi ............................... 29/889.5 |
| 5,109,604 * | 5/1992 | Koebele .............................. 29/889.5 |
| 5,197,190 | 3/1993 | Coolidge . |
| 5,373,144 | 12/1994 | Thelander . |
| 5,374,809 | 12/1994 | Fox et al. . |
| 5,384,958 * | 1/1995 | O'daniel et al. .................... 29/889.5 |
| 5,588,019 | 12/1996 | Ruffini et al. . |
| 5,683,607 | 11/1997 | Gillespie et al. . |
| 5,705,794 | 1/1998 | Gillespie et al. . |

OTHER PUBLICATIONS

"The Principles of Uniform Magnetic Heating (UMH)", Mitsubishi International Corporation & CoreFluxSystems International, Ltd.

"Patented Heat Treating System Uses Magnetic Field Technology for Through–Heating of Metal Parts" by D. Keith Patrick, Industrial Heating/Mar. 1998.

"Uniform Magnetic Heating", CoreFlux Systems International & Mitsubishi International Corporation.

* cited by examiner

Primary Examiner—Irene Cuda
(74) Attorney, Agent, or Firm—David B. Kelley

(57) ABSTRACT

A method for making a torque converter includes the steps of forming a blade having a tab extending outward from the blade and along a portion of a length of the blade. A recess is formed in the housing sized to receive the first tab. The recess defines an edge adjacent the tab and extending along the tab. The tab is inserted within the recess to form a housing assembly. A brazing material is provided between the tab and the housing. The assembly is positioned within a magnetic heating machine and magnetically heated

17 Claims, 3 Drawing Sheets

TORQUE CONVERTER BLADES BRAZED TO A HOUSING USING A MAGNETIC HEATING PROCESS

FIELD OF THE INVENTION

The present invention relates to a torque converter impeller or turbine and brazing process therefor using a magnetic field heating. More particularly, it pertains to brazing thin sheet metal blades of a fluid coupling or torque converter to a housing.

DESCRIPTION OF THE PRIOR ART

Our invention relates generally to a hydrokinetic torque transmitting mechanism, and more particularly to an improvement in the construction and assembly of components of a bladed hydrokinetic member such as the impeller of a torque converter or fluid coupling.

U.S. Pat. No. 4,868,365, assigned to the assignee of the present invention, which is incorporated herein by reference in its entirety, describes a method for using a laser welding beam to weld the blades to a torque converter housing. The process described in the '365 patent is very effective but time consuming as the laser beam must traverse each of the blades in order to secure each blade to the housing. As further described in the '365 patent, at column 2, brazing has typically been found to be less satisfactory because of the strength of the attachment of the blade to the housing. It does not permit adequate structural deflections of the housing in service. Furthermore, brazing typically requires passing the entire assembly of the torque converter impeller or turbine, including the impeller or turbine blades, through an oven, and uniformly heating the entire assembly to cause adequate heating of the brazing material. Furthermore, the oven typically includes an inert environment to ensure proper brazing of the blades to the housing.

It would therefore be desirable to provide a new method for securing blades to a housing of a torque converter not requiring the use of a laser striking each blade nor requiring heating of the entire assembly.

SUMMARY OF THE INVENTION

Accordingly, a method for brazing impeller blades to a housing is provided herein. A method according to the present invention does not require complete heating of the overall housing nor does it require a laser beam weld of each individual impeller blade.

A further advantage of the method according to the present invention is that the hub of the torque converter impeller will not be heat treated during the brazing process. Therefore, the hub may be integrally formed in the impeller cover or welded thereto prior to the brazing operation. Therefore, the additional operations of welding the hub may be eliminated and/or heat treatment thereto.

Accordingly, a method for making a torque converter is provided including the steps of forming a blade having a tab extending outward from the blade and along a portion of a length of the blade. A recess is formed in the housing sized to receive the first tab. The recess defines an edge adjacent the tab and extending along the tab. The tab is inserted within the recess to form a cover assembly for an impeller or turbine. A brazing material is provided between the tab and the housing. The assembly is positioned within a magnetic heating machine and magnetically heated.

DETAILED DESCRIPTION OF PREFERRED EMBODIMENT(s)

Figures 1, 2:
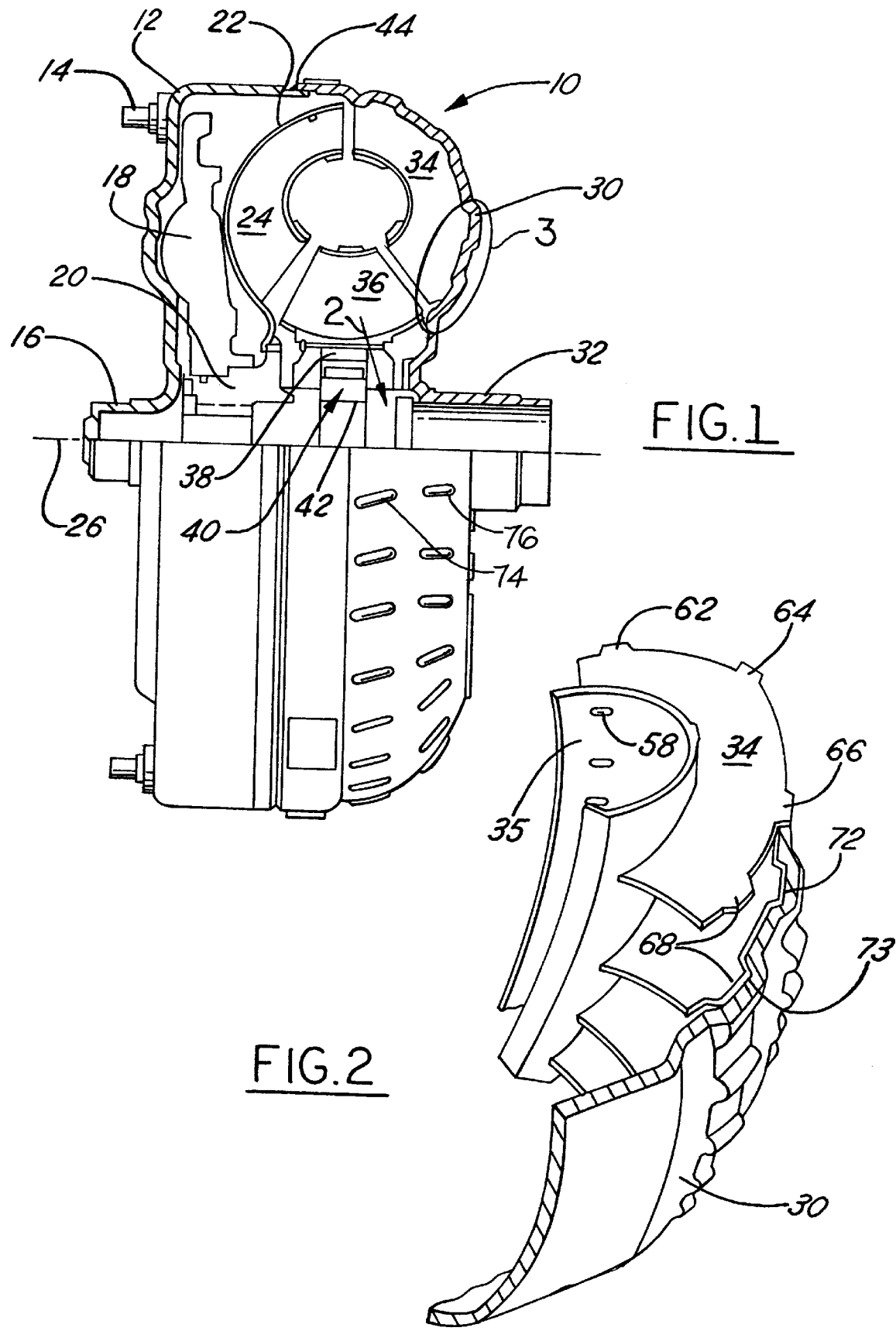
FIG. 1 is a side view, partially in cross section, of a hydrokinetic torque converter showing an impeller, turbine, and reactor blade, impeller housing, and converter cover.
FIG. 2 is a perspective view of the torque converter of FIG. 1 showing the impeller housing, shroud, and blade located between the shroud and housing.

Referring to FIG. 1, an automotive torque converter or fluid coupling 10 for an automatic transmission includes a cover 12 adapted for connection by a mechanical attachment to a flywheel (not shown) which is adapted to be driven by an engine crankshaft. The cover 12 is supported on a surface 16 which is adapted to fit within a recess formed on the end of the engine crank shaft. A lockup clutch 18 is rotatably supported on the hub 20 of a turbine rotor 22, which includes multiple turbine blades 24, rotatably supported on the hub 20 and distributed angularly about a longitudinal axis 26 extending along the length of the torque converter parallel to the engine crank shaft. Following assembly, the torque converter is substantially symmetric about the axis 26.

An impeller housing 30 is rotatably supported on the impeller hub 32 and contains multiple impeller blades 34, spaced from one another angularly about the axis 26. Alternatively, the impeller may be referred to as a pump. The impeller blades 34 are disposed symmetrically about the axis 26, spaced uniformly from one another, and fixed mechanically to a housing 30 and shroud so that the blades 34 and housing 30 rotate as a unit about the longitudinal axis 26.

A reactor assembly includes multiple reactor blades 36 connected to an outer member 38 of a one-way clutch 40, whose inner member is adapted to be connected at a spline 42 to the outer surface of a transmission stator support shaft (not shown), or by a one-way driving connection made by the clutch 40 to the stator support shaft. The impeller housing 30 and torque converter cover 12 are overlapped and joined by a weld 44 that extends around the periphery of the housing 30 and cover 12, thereby forming the seam that seals the space within the housing 30 and the cover 12 and prevents flow of hydraulic fluid past the weld 44. Preferably, the weld 44 is performed using a gas metal arc or a laser welding technique.

Figure 3:
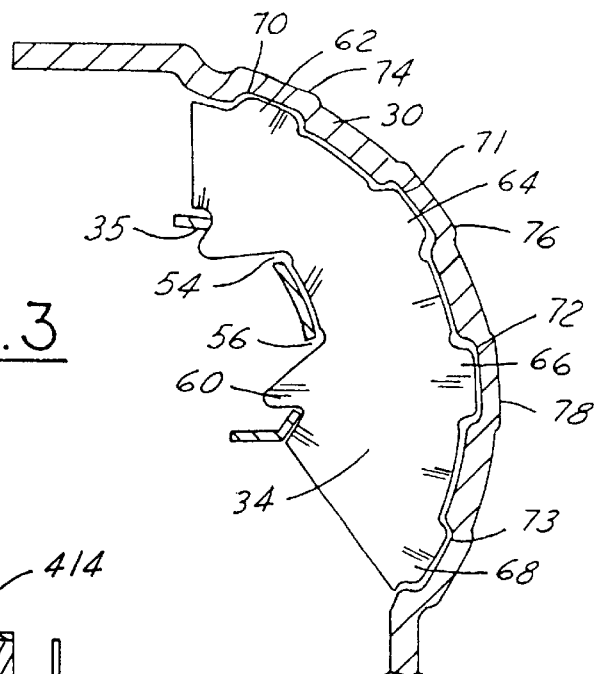
FIG. 3 is an enlarged view of the portion in circle of FIG. 1 showing an impeller blade located on the impeller housing.

FIG. 3 shows in greater detail the impeller housing 30, impeller blades 34 located on the housing 30, and a shroud 35 located at the radially inner surface of the blade 34. The shroud 35 is substantially symmetric about the axis 26 and serves to confine the hydraulic fluid contained in the impeller between the inner surface of the impeller housing 30 and the outer surface of the shroud 35. The shroud 35 has openings 54, 56 through its thickness, into which openings 54, 56, inner blade tabs 58, 60 protruding from the inner surface of the blades 34, extend. These tabs 58, 60 are then bent by a roller supported on the inner surface of the shroud 35 to mechanically connect the tabs 58, 60 to the shroud 35, as described in U.S. Pat. No. 3,316,622.

Each blade 34 is also formed with outer tabs 62, 64, 66 and 68 which are fitted within recesses 70, 71, 72 and 73 formed in the impeller housing 30 while the housing 30 is press-formed to its final shape. The recesses 70–72 appear on the outer surface of the housing 30 in the lower half of FIG. 1 as embossments 74, 76 and 78, protruding from the otherwise smooth outer surface of the housing 30. The embossments 74, 76, 78 are local and each extends along the length of the corresponding tab fitted in the recess 70–72.

FIG. 2 shows that each impeller blade 34 is curved and extends along the toroidal path bounded by the housing 30 and shroud 35. The blades 34 are spaced uniformly and angularly about the axis 26. The blade tabs 62–68 located within the recesses 70–73 on the impeller housing 30 are secured thereto using the brazing process herein. Similarly, the blades 34 are brazed to the shroud 35 during the brazing process.

The impeller is formed and assembled by first embossing the impeller housing 30, preferably at up to four locations for each of 31 or 33 blades 34 of the impeller, thereby forming 31 or 33 sets of recesses 70–73. Next, each of the tabs 62–68 for each blade 34 is inserted into the corresponding recess 70–73. These recesses 70–73 are formed and dimensioned in relation to the tabs 62–68 so that the curvature of the blade 34 is maintained and the blade 34 is located in relation to the housing 30 as indicated in FIGS. 2 and 3. Then, the radially inner tabs 58, 60 of each impeller blade 34 are inserted into the respective hole 54, 56 of the shroud 35, and these inner tabs 58, 60 are rolled by a tool causing the tabs 50, 60 to bend across the thickness of the shroud 35 and to engage the inner surface of the shroud 35. The impeller so assembled is then passed through a washer to degrease and clean the surfaces, after which it is dried.

Figure 4:
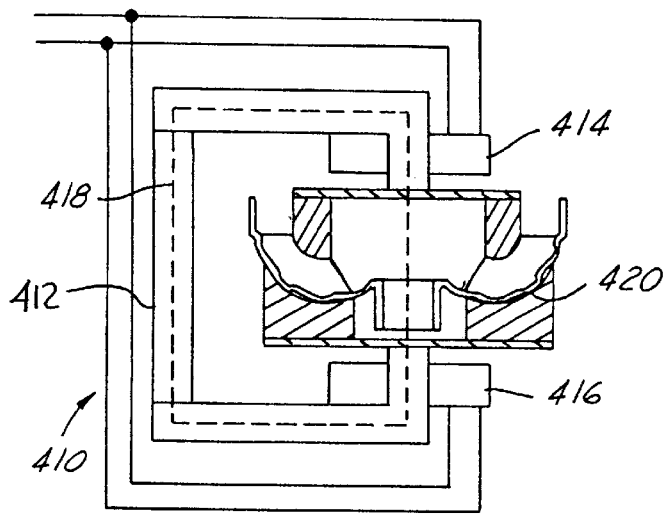
FIG. 4 illustrates a magnetic heating unit with a torque converter impeller provided therein.

Thereafter, the impeller assembly is placed within a magnetic field heating brazing machine according to the present invention, as indicated in FIG. 4. A preferred brazing machine is commercially available and described in *Industrial Heating*, March 1998, at pp. 61–68. A supplier for such equipment is Coreflux Systems International Ltd. Such a device is described in U.S. Pat. No. 5,025,124, which is incorporated herein by reference in its entirety.

In a first embodiment, each of the impeller blades 34 is coated with a copper based brazed material and installed as described above to the housing 30 and shroud 35. The assembly is then heated within the magnetic heater to melt the copper coating and thereby braze the impeller blade 34 to the housing 30. A preferred braze filler material is AWS-ASTM spec, BCu-1, 99% min, copper content. In one embodiment, the filler is used in an atmospheric environment without flux. In an alternative embodiment, a flux may be used and/or a reducing atmosphere.

Alternatively, the braze filter material may be applied as a liquid paste or powder. Preferably, the joint clearances between the impeller blades 34 and the housing range from a press-fit to a 0.05 mm clearance.

As shown in FIG. 4, an impeller assembly 420 is placed within the magnetic heating machine 410. The machine 410 includes a C-frame 412 and a pair of coils 414, 416. The machine 410 includes a drive system to close the C-frame 412 onto an assembly 420 and effectively clamp the assembly 420 into place. This clamping ensures the assembly 420 does not move during the magnetic heating process. A variable frequency motor control unit causes an alternating magnetic field 418 to generate a flux through the structure, alternately aligning the magnetic domains and releasing energy in the form of uniform heating throughout the assembly 420 locally in the region of the assembly 420 to be brazed. By so heating the assembly 420, the hub 32 is not annealed and therefore the hardness of the hub 32 is maintained. Therefore, in a preferred embodiment, the hub 32 is integrally formed in the impeller housing 30 and not welded thereto as in U.S. Pat. No. 4,868,365.

Figure 5:
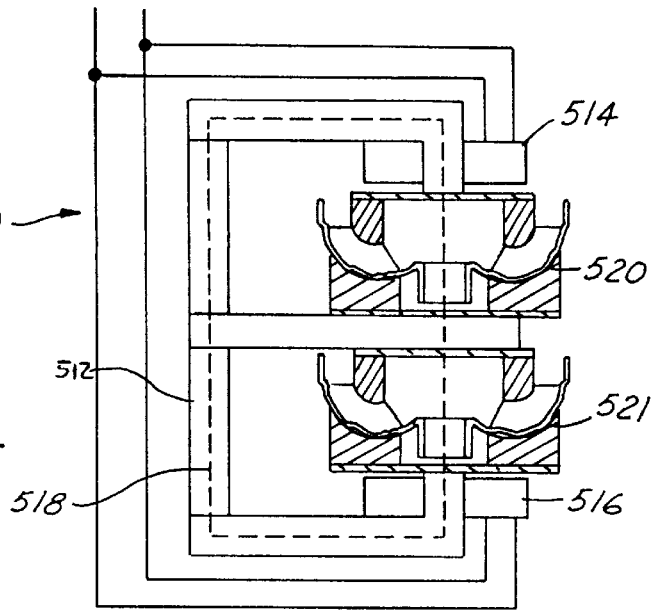
FIG. 5 illustrates a magnetic heating unit with a pair of torque converter impellers provided therein.

FIG. 5 includes the same reference numbers as FIG. 4, but preceded by a "5", versus the "4" prefix of FIG. 4. In FIG. 5, a further embodiment is illustrated where a pair of assemblies 520, 521 are stacked in a magnetic heating machine 510. The machine 510 includes a C-frame 512 and a pair of coils 514, 516 similar to those described above. The machine 510 creates a similar magnetic field 518 to heat both assemblies 520, 521 to melt the braze filter material (not shown).

Figure 6:
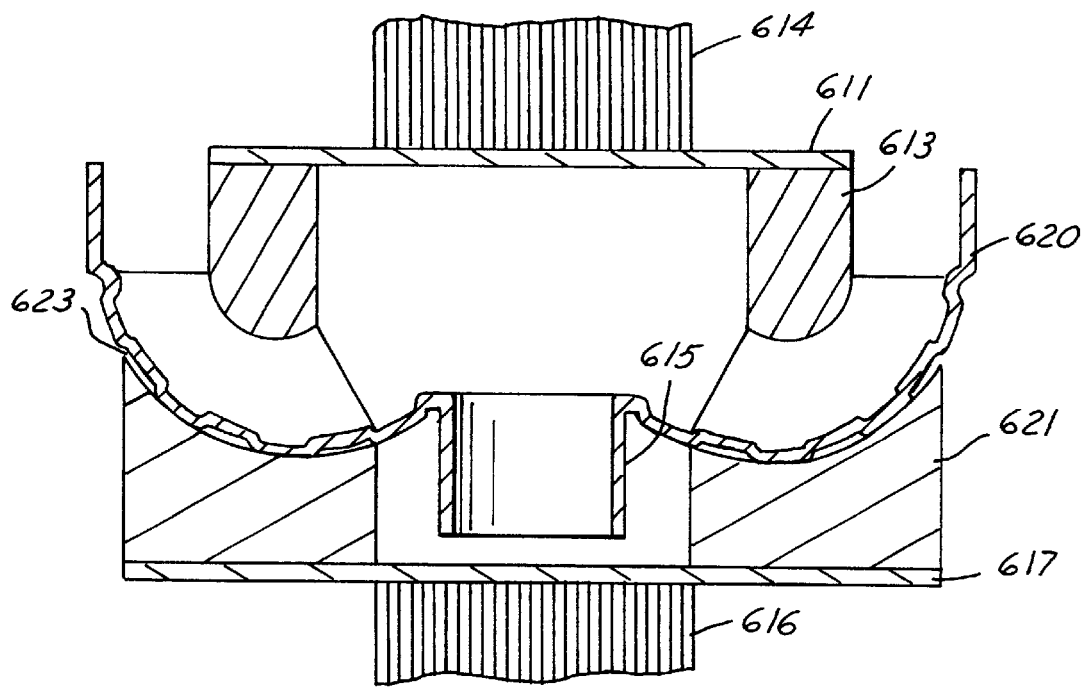
FIG. 6 is an enlarged view of the unit of FIG. 4.
Figure 7:
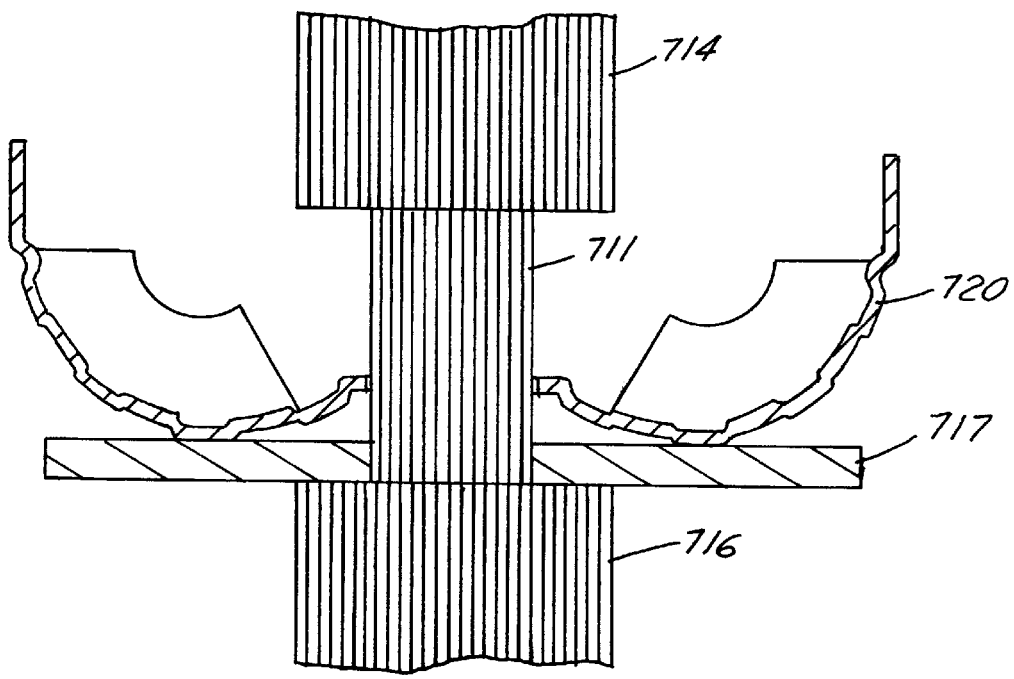
FIG. 7 is an enlarged view of an alternate embodiment of the unit of FIG. 4.

FIGS. 6 and 7 illustrate in greater detail the machine of FIG. 4 in the area of the assembly. Here the impeller 620 is supported by a steel extension 621. An insulating material (not shown) may be provided in a gap 623 between the impeller 620 and extension 621 to support the impeller 620 without excessively heating the extension 621. The extension 621 is fixed to a steel plate 617 attached to a lower core 616. The core 616 directs the magnetic flux to (or from) the impeller 620 in a manner similar to the core described in my copending application filed herewith, entitled "METHOD FOR ANNEALING STAMPED COMPONENTS", and which is incorporated herein by reference. Similarly, upper core 614 supports a plate 611, supporting a second extension 613 to direct the flux to (or from) the impeller 620. Preferably the first extension 621 includes locating details to radially and axially locate the impeller 620 to the extension 621. One skilled in the art appreciates this is done by locating to a surface of the impeller 620 and/or the hub 615, and is therefore not described here in great detail.

The cover 720 of FIG. 7 does not include an integrally-formed hub as illustrated in FIG. 6 at 615, and therefore the heating machine in this embodiment is configured in a different manner. The lower core 716 supports a plate 717, upon which the cover 720 is held. The upper core 714 includes an extension 711 extending through the cover 720 where the hub 615 of FIG. 6 is otherwise present. Using this configuration, the entire cover 720 is heated and the blades are brazed as described above.

Although the above description refers to an impeller assembly, one skilled in the art appreciates this process may be performed identically to braze turbine blades in a turbine assembly. With a turbine assembly, the turbine shell is substituted for the impeller housing in the above description. The turbine blades are then brazed to the turbine shell in a manner similar to that described above for the impeller blades. Thus, as the claims below claim a housing assembly, the housing assembly includes the turbine shell or, alternatively, the impeller housing.

Although the preferred embodiments of the present invention have been described, it will be apparent to a person skilled in the art that variations may be made to the assembly that is described herein without departing from the scope of the invention as defined in the following claims.

What is claimed is:

1. A method for making a torque converter comprising the steps of:

forming a blade having a first tab extending outward from the blade and along a portion of a length of the blade;

forming a recess in a housing sized to receive the first tab therein, the recess defining an edge adjacent the first tab and extending along the first tab;

inserting the first tab within the recess to form a housing assembly;

positioning the housing assembly within a magnetic heating machine;

providing brazing material between the first tab and the housing; and magnetically heating the first tab and the housing at the recess.

2. The method of claim 1, further comprising the step of clamping the housing assembly to the magnetic heating machine.

3. The method of claim 2, wherein the brazing is performed in an atmospheric environment.

4. The method of claim 2, wherein the brazing is performed in a nitrogen environment.

5. The method of claim 2, wherein the brazing material is provided as a coating on the blade.

6. The method of claim 5, wherein the housing comprises an impeller cover comprising an integrally formed hub and the hub is substantially not heat treated during the magnetic heating process.

7. The method of claim 1, further comprising the steps of:

forming a second blade having a second tab extending outward from the second blade and along a portion of a length of the second blade;

forming a second recess in a second housing sized to receive the second tab therein, the second recess defining a second edge adjacent the second tab and extending along the second tab;

inserting the second tab within the second recess to form a second housing assembly;

positioning the second assembly within the magnetic heating machine in a stacked relationship to the first assembly;

providing brazing material between the second tab and the second housing; and substantially simultaneously magnetically heating both the first and second tabs and the first and second housings at the first and second recesses, respectively.

8. The method of claim 7, wherein the brazing is performed in an atmospheric environment.

9. The method of claim 7, wherein the brazing material is provided as a coating on the impeller blades.

10. The method of claim 9, wherein one of the housings comprises an impeller cover comprising an integrally formed hub and the hub is substantially not heat treated during the magnetic heating process.

11. The method of claim 7, wherein the brazing is performed in a nitrogen environment.

12. The method of claim 2, wherein a shroud is provided adjacent the blade on a side of the blade opposite the housing, said blade having a second tab brazed to the shroud, the method further comprising the steps of:

providing brazing material between the second tab and the shroud; and magnetically heating the tab and the shroud while the tab and housing are heated.

13. A method for making a bladed torque converter having a housing carrying multiple blades, comprising the steps of:

forming a blade having multiple tabs extending outwardly from the blade and spaced from adjacent tabs around the periphery of the blade, each blade having a first tab extending along a portion of the length of the blade;

forming a plurality of recesses in the housing aligned in at least two rows, each row spaced from an adjacent row about a longitudinal axis of the torque converter, each recess of a row being located and sized to receive a corresponding tab therein, at least one recess of each row defining an edge adjacent the corresponding tab and extending along the tab;

inserting the tabs within the corresponding recesses, thereby forming a housing assembly;

positioning the housing assembly within a magnetic heating machine;

clamping the housing assembly to the magnetic heating machine;

providing a brazing material between each of the tabs and the housing; and activating the magnetic heating machine to kinetically heat the brazing material to braze the tabs to the housing.

14. The method of claim 13, wherein the brazing is performed in an atmospheric environment.

15. The method of claim 14, wherein the brazing material is provided as a coating on each of the blades.

16. The method of claim 15, wherein the housing comprises an impeller cover comprising an integrally formed hub and the hub is substantially not heat treated during the magnetic heating process.

17. The method of claim 15, further comprising the step of inserting a core through an opening provided in the housing and heating the entire housing.

* * * * *